July 26, 1949. E. WILDHABER 2,477,105
INDEX MECHANISM

Filed Dec. 18, 1947 3 Sheets-Sheet 1

Inventor
ERNEST WILDHABER
By
B. Eshlinger
Attorney

July 26, 1949.  E. WILDHABER  2,477,105
INDEX MECHANISM
Filed Dec. 18, 1947  3 Sheets-Sheet 2

Inventor
ERNEST WILDHABER
By
Schlesinger
Attorney

July 26, 1949.   E. WILDHABER   2,477,105
INDEX MECHANISM

Filed Dec. 18, 1947   3 Sheets-Sheet 3

Inventor
ERNEST WILDHABER
By
B. E. Shlesinger
Attorney

Patented July 26, 1949

2,477,105

UNITED STATES PATENT OFFICE 2,477,105

INDEX MECHANISM

Ernest Wildhaber, Brighton, N. Y., assignor to Gleason Works, Rochester, N. Y., a corporation of New York Application December 18, 1947, Serial No. 792,570

9 Claims. (Cl. 74—393)

The present invention relates to indexing mechanisms and particularly to indexing mechanisms of the type employed on machines for producing gears.

Geneva mechanisms are quite extensively used for indexing purposes because in such mechanisms the driver may rotate continuously at a uniform velocity while the driven member or Geneva wheel is actuated only intermittently. Moreover in such a mechanism, the motion of the Geneva wheel is of the slow-start and slow-stop character, that is, when it is rotated, it is gradually accelerated to top speed and gradually decelerated to a stop on completion of the indexing motion. Thus, shocks and vibrations may be avoided.

With the conventional type Geneva mechanism, however, the Geneva wheel can not be rotated through more than 90° per index. This means that gearing-up between the driven member and the work spindle has often to be resorted to to achieve the desired indexing rotation of the work spindle.

A primary object of the invention is to provide an indexing mechanism which in modified form is of the Geneva type and which is an improvement over known Geneva-type indexing mechanisms.

Another object of the invention is to provide an indexing mechanism having a driving member, which may rotate continuously, and a driven member which is rotated intermittently by the driving member, in which the driven member turns, when actuated, through an angle larger than 90°, preferably through an angle of 180°.

Another object of the invention is to provide an indexing mechanism in which the driven member turns through an angle of 180° while the driver turns through an angle of 90°.

A further object of the invention is to provide an indexing mechanism in which in an indexing operation the driven member is first accelerated, then turns at a constant speed, and then is gradually slowed down to a stop, and in which the acceleration is more nearly constant than in the conventional Geneva-type index mechanism.

A further object of the invention is to provide an indexing mechanism in which during indexing the driven member has constant acceleration and constant deceleration.

A still further object of the invention is to provide an indexing mechanism of the character described in which the pin or projection on the driver, that engages in a slot on the driven member to transmit rotation from the driver to the driven part, moves in one direction only through a slot on the driven member. This contrasts with the conventional Geneva mechanism where the driven member or wheel is shaped like a Maltese cross and the driving pin reverses its direction as it effects indexing rotation of the Geneva wheel.

Still another object of the invention is to provide an indexing mechanism in which actuation is partially through a pin and a slot and partially through segmental gears, and in which the pin and slot produce gradual acceleration and gradual deceleration of the driven member during the first and last parts of the indexing operation, and the segmental gears produce uniform motion of the driven member between acceleration and deceleration thereof.

Other objects of the invention will be apparent hereinafter from the specification and from the recital of the appended claims.

Figure 2:
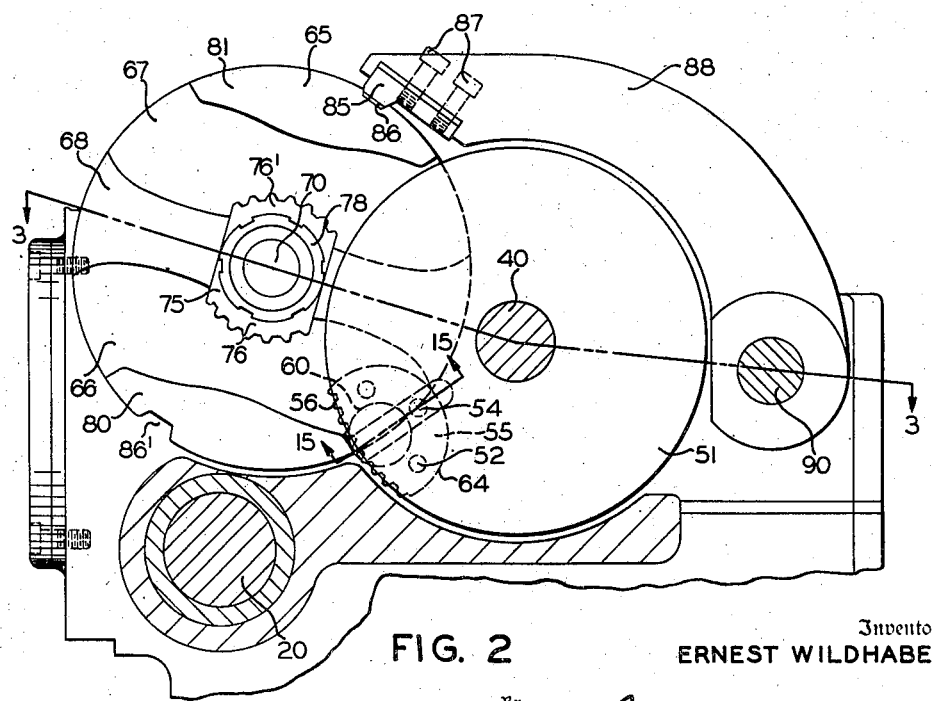
Fig. 2 is a sectional view taken in a plane parallel to the plane of Fig. 1 and further illustrating the construction of the index mechanism.
Figure 14:
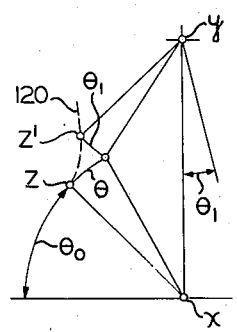
Figure 15:
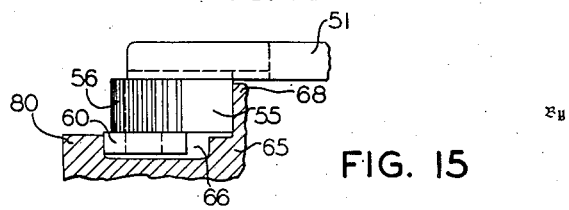

Figs. 9, 10, 11, 12, and 13 are diagrammatic views showing successive positions of the drive and driven members in the indexing operation;

Fig. 14 is a diagrammatic view showing how the shape of the slots on the driven member may be determined; and Fig. 15 is a fragmentary sectional view on the line 15—15 of Fig. 2.

An index mechanism built according to the present invention may be used, of course, upon various type machines. The indexing mechanism illustrated is particularly adapted for use upon a machine such as disclosed in the pending application of Arthur L. Stewart and Leonard O. Carlsen, Serial No. 779,890, filed October 15, 1947.

The driving member of the index mechanism is preferably rotated on its axis continuously at a uniform velocity. It may be driven in any suitable manner in time with the other operations of the machine upon which the index mechanism is used. In the drawings, 20 (Figs. 2 and 3) denotes a shaft which is journaled on anti-friction bearings 21 in a bracket 22 of the machine and which is adapted to be driven in time with the other operations of the machine. There is a bevel gear 24 keyed to this shaft which meshes with a bevel 25 (Fig. 1) that is keyed to the lower end of a diagonal shaft 26. The shaft 26 is journaled in any suitable manner in the bracket 27 that is fastened to the bracket 22. This shaft may be journaled at its lower end on anti-friction bearings 28.

Integral with the shaft 26 is a cylindrical pinion 30 which meshes with a hypoid face gear 31. This gear is secured by screws 32 (Fig. 3) to a sleeve 33. The sleeve has face clutch teeth formed on its front end that are adapted to be engaged by face clutch teeth formed on the rear end of a ring member 35. The ring member 35 is keyed to a sleeve 36. The face clutch is adapted to be held closed, to connect the gear 31 to the sleeve 36, by a nut 38 which threads onto the sleeve. A coil spring 39, which surrounds the sleeve and which is interposed between a shoulder on the sleeve and the ring 35, operates to release the face clutch on loosening of the nut 38.

The sleeve 36 is keyed to a shaft 40. This shaft is journaled on anti-friction bearings 42 and 43 in the bracket 22 parallel to shaft 20. A cap disc 44 which is secured to the shaft 40 by screws 45 serves to seal the outer end of the sleeve 36.

Keyed to the shaft 40 are a cam member 50 and the drive plate 51 of the index. Secured to the plate 51 by screws 52 and a dowel pin 54 (Figs. 2 and 4) is a projection or block 55 and journaled on a lug or boss 58 formed on this block is a roller 60. The roller is held on the block by a disc 61 and a screw 62. The block 55 is approximately semi-circular in shape and has a gear segment 56 formed on its outside periphery. The segment 56 is coaxial with the axis of driving plate 51, that is, with the axis of shaft 40. The roller 60 is co-axial with the semi-cylindrical surface 64 of the block 55.

The plate 51 is adapted to drive a driven member or Geneva wheel 65 through the block 55 and gear segment 56. The block 55 is adapted to engage successively in the two slots 66 and 67 which are formed on the front face of the Geneva wheel 65 and which extend approximately chord-ally thereacross. The two slots are separated by the central rib 68 of the Geneva wheel, whose opposite sides form, respectively, one boundary of each of the slots.

The Geneva wheel 65 is keyed to a shaft 70 which is journaled on anti-friction bearings 71 in the frame 72 of the machine in parallelism to shafts 20 and 40. Mounted within a recess formed in the front face of the Geneva wheel 65 and keyed to the shaft 70 is an intermittent spur gear 75 which has two groups of gear teeth 76 and 76' formed on its periphery at opposite sides of the axis of shaft 70. These teeth are coaxial with the shaft 70. The gear 75 is held in place by a nut 78 that threads onto the forward end of the shaft 70.

The slots 66 and 67 are bounded, as stated, on one side by the opposite side walls of the rib 68 of the plate 65. The inside walls of the ribs 80 and 81 of the plate 65 form the opposite boundaries of these slots. The central rib 68 of the plate 65 is of greater thickness axially of the plate, as shown clearly in Fig. 15, than the two ribs 80 and 81. The thickness of the rib 68 is such that cylindrical surface 64 of block 55 can engage it, but the thickness of the ribs 80 and 81 is such that they will only be engaged by roller 60 and the block 55 can swing over them, without interference, in the operation of the index mechanism. The teeth 76 and 76' of the gear 75 register with the side walls of the rib 68 so that these teeth can mesh with gear segment 56 in the movement of block 55 through slot 66 or 67.

The Geneva wheel 65 is held against rotation, except during the indexing period, by a lock-dog 85. This lock-dog is adapted to be engaged alternately with the notches 86 and 86' formed in the periphery of the Geneva wheel. The lock-dog is secured by screws 87 to a lever arm 88 that is keyed to a shaft 90 which is suitably journaled in bracket 22.

Figures 3, 4, 5, 6, 7:
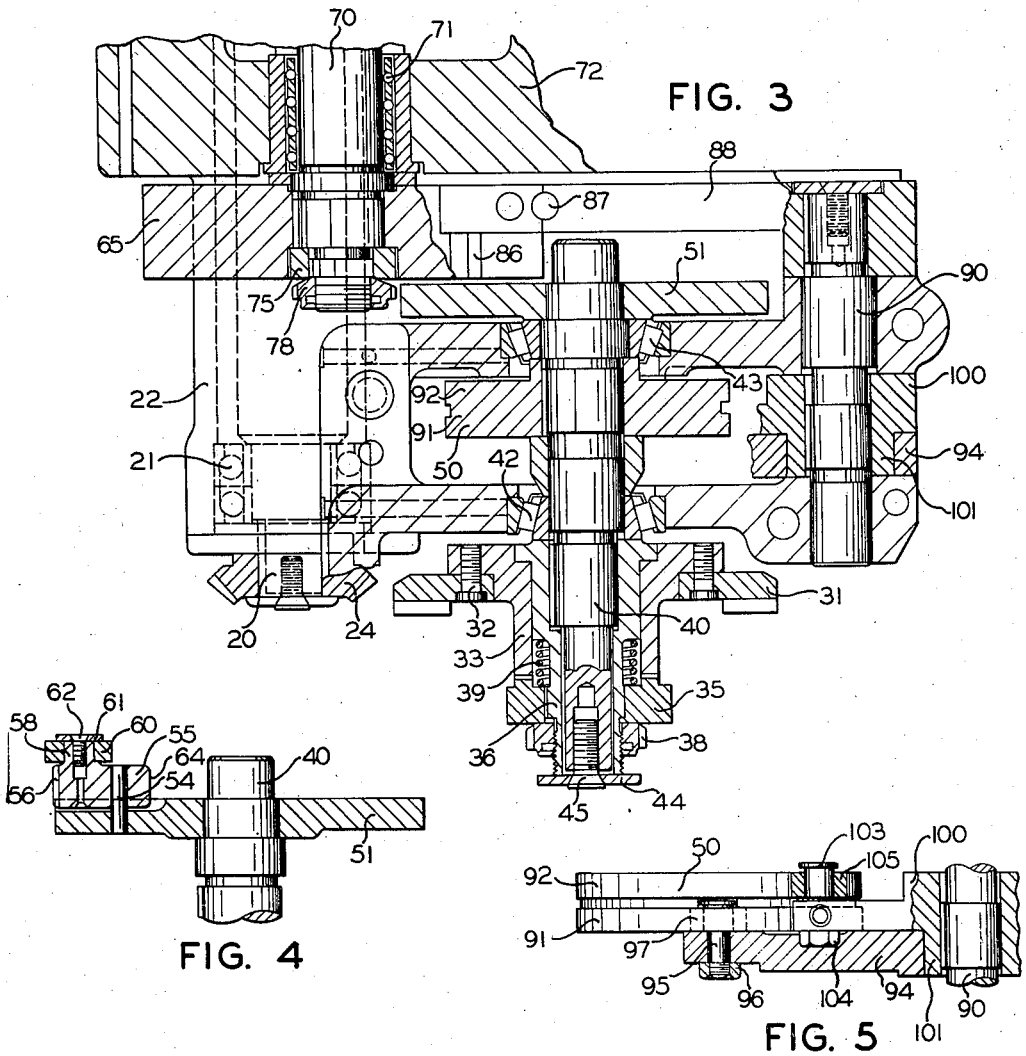
Fig. 3 is a sectional view on the line 3—3 of Fig. 2, looking in the direction of the arrows.
Fig. 4 is a diametrical sectional view through the drive member of the index mechanism.
Fig. 5 is a fragmentary plan view, with parts broken away, showing the trip cam and trip lever of the index mechanism.
Figs. 6 and 7 are views at right angles to one another, with parts broken away, showing in detail the trip and the lock-up levers of the index mechanism.

The cam 50 has two trackways 91 and 92 (Fig. 3). Keyed to the shaft 90 is a lever 100. Journaled on the hub 101 (Fig. 6) of this lever is a double-armed lever 94. Journaled on a stud 95 which is secured by nut 96 in the outer end of one arm of this lever is a roller 97 (Figs. 1 and 7) which is adapted to engage with track 91 of cam 50. The other arm of this lever is connected by a bolt 98 with lever 100. Journaled on a stud 103 which is secured to lever 100 by a nut 104 (Fig. 5) is a roller 105 which engages the trackway 92 of the cam 50. A coil spring 107 (Fig. 7), which surrounds the bolt 98 and is housed in a recess in the upper arm of lever 94, serves to press the adjacent arms of the levers 94 and 100 apart to hold the rollers 97 and 105 in engagement with their respective cam tracks 91 and 92. The nut 99 (Fig. 7), which threads onto bolt 98, serves to adjust the tension of spring 107.

Figure 1:
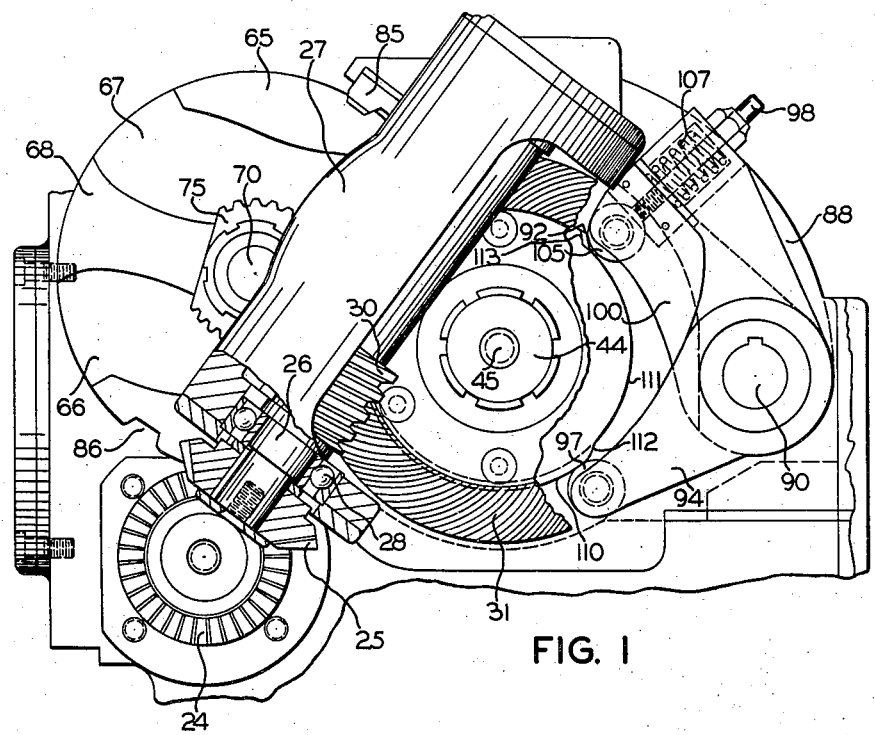
Fig. 1 is a side elevational view, with parts broken away, showing an index mechanism built according to one embodiment of the invention.

The lock-up and trip parts of the index mechanism are somewhat similar in construction to the corresponding parts of the index mechanism disclosed in the U. S. patent to Carlsen No. 2,352,689, granted July 4, 1944. Each of the cam tracks 91 and 92 has two dwell portions, one of which is of greater radius than the other; and the two dwell portions are connected by suitable rises. In the index mechanism of the present invention, however, the two dwell portions of each cam have unequal angular extent whereas in the index mechanism disclosed in the Carlsen patent they have approximately equal angular extent. In Fig. 1, the dwell portion of cam track 91 which is of major radius, is indicated at 110, and the dwell portion, which is of minor radius, is indicated at 111. On this cam track the portion, which is of major radius, extends around approximately three-fourths of the periphery of the cam. One of the rises, which connect the two dwell portions, is denoted at 112. The other rise is designated 113. The contour of the cam track 92 is similar to that of cam track 91 except that on this cam track, the portion, which is of major radius, extends for approximately only one-quarter of the periphery of the cam.

The high and low portions of the cam tracks 91 and 92 are preferably so located relative to one another that approximately when the roller 97 rides down off of the high portion 110 of the cam track 91, the roller 105 will roll up off of the low portion of the cam track 92 onto the high portion thereof, and, vice-versa, when the roller 97 rides up on the high portion 110 of the cam track 91 again, at the end of the indexing operation, the roller 105 will simultaneously roll down onto the low portion of cam track 92 again. Thus the return of the locking-dog 85 into engagement with the driven wheel 65 will be cushioned through operation of spring 107.

Figure 8:
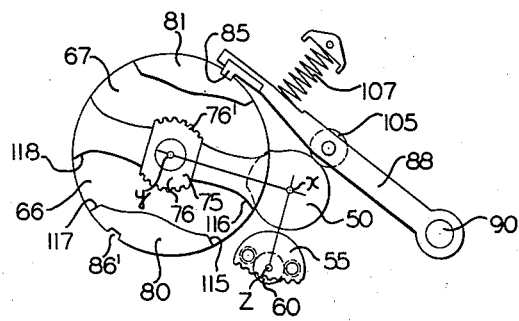
Fig. 8 is a diagrammatic view showing the positions of the operating parts of the index mechanism when the index mechanism is locked-up.

Figs. 1 and 8 show the positions of the parts when the index mechanism is locked against rotation. Here the roller 105 is on a low part of the cam track 92 while the roller 97 is on a high part of the cam track 91. Hence the locking-dog 85 is held in locking position. The cam 50 may rotate all the while in the operation of the machine. When the roller 97 rides down off of the high portion 110 of cam track 91, then, onto the low portion 111 thereof, the lever 88 is swung upwardly, that is, clockwise about the axis of the shaft 90, to disengage the locking-dog 85 from the Geneva wheel 65 to release the Geneva wheel 65.

The operation of the index mechanism will now be described particularly with reference to the diagrammatic views of Figs. 8 to 13 inclusive.

Fig. 8 shows a position where the block 55 is out of engagement with the Geneva wheel. As the driver 51 rotates clockwise about the axis $x$ of shaft 40, this block comes into engagement with the right hand end of the slot 66, for instance, of the Geneva wheel. Simultaneously the rollers 105 and 97 will have ridden on the trackways 92 and 91, respectively, to the point where the lock-dog 85 is tripped out of engagement with the Geneva wheel. Fig. 2 illustrates the condition where the block 55 has just entered the right hand end of the slot 66 and the locking-dog is still in locked position. An instant later, the cam will trip the locking-dog out of engagement with the Geneva wheel. The entry of the block 55 into the slot 66 before this takes place insures that when the Geneva wheel is released, the block or projection 55 will be in driving engagement with it. This insures control of the Geneva wheel so that accurate indexing is obtained.

Figure 9:
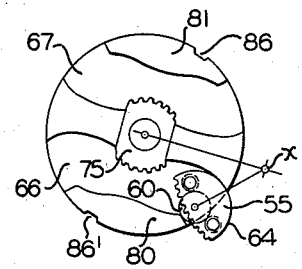

Fig. 9 illustrates diagrammatically a further position of the parts when the block 55 has taken control and is driving the Geneva wheel. It will be noted that in both Figs. 2 and 9 the roller 60 is in engagement with the part 115 of one side wall of the slot 66 while the arcuate surface 64 of the block 55 is in engagement with the portion 116 of the opposite side wall of the slot. Thus the Geneva wheel is held and driven firmly.

Figure 10:
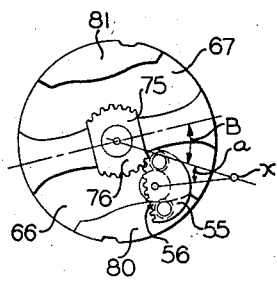

Fig. 10 shows a further position in the indexing operation where driver 51 has rotated further clockwise about the axis $x$ of shaft 40. Here the block 55 has rotated far enough for the teeth of the segment 56 to come into engagement with the teeth 76 of gear 75. The segment 56 now takes over the drive of the Geneva wheel 65 and drives it at a uniform velocity.

Figure 11:
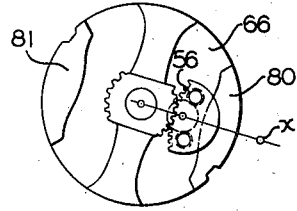

Fig. 11 shows a further position where segment 56 has been rotated to its central position and the drive is here completely controlled by segment 56 and gear 75.

Figure 12:
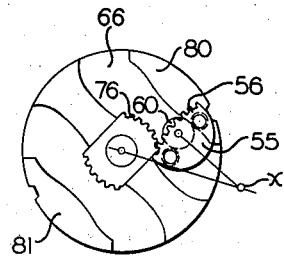

Fig. 12 shows a still further position where the segment 56 is about to roll out of engagement with the gear 75. The roller 60 is again in engagement with the opposite side wall of the slot 66. From this point on block 55 again resumes control through its arcuate surface 64.

Figure 13:
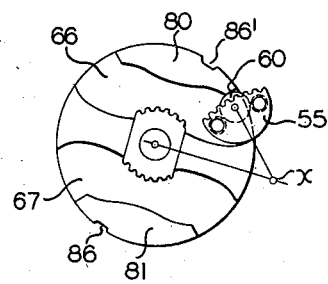

Fig. 13 shows a position where the roller 60 and block 55 are about to disengage from the track 66. It is just after this point that the locking-dog 88 is returned into engagement with the Geneva wheel to lock the wheel again, locking-dog 85 now entering notch 86' of the Geneva wheel. It will be observed that the roller 60 and block 55 continue to maintain control of the motion of the Geneva wheel, however, until the wheel has actually been locked up again. As seen in Fig. 13, the roller 60 is in engagement with the portion 117 (Fig. 8) of one side wall of the slot 66 while the arcuate portion 64 of the block 55 is in engagement with the portion 118 of the other side wall of the slot. An instant later the locking-dog returns into locking position. The indexing operation has thus been completed.

In the further rotation of the plate 51 about its axis $x$, the roller 60 and block 55 move out of engagement with the slot 66. The plate 51 continues to rotate about its axis $x$ and when the block 55 has rotated clockwise to the position shown in Fig. 2, indexing begins again with the block entering the slot 67 of the Geneva wheel and the lock-dog 85 again being moved out of locking position.

In the embodiment of the invention illustrated, indexing takes place during one quarter of a turn of the driver 51; and indexing then takes place during one quarter of a turn of shaft 20, that is, during one quarter of the time of the tooth cycle of the gear cutting or gear grinding machine on which the index mechanism is used. A faster indexing time can be obtained by rotating the driver through a plurality of turns per tooth cycle and shifting the driver axially so that it is clear of the driven member on all but one of said plurality of turns. One form of mechanism for thus shifting the driver is shown in the Carlsen Patent No. 2,352,689 above mentioned.

To insure quiet, smooth operation, it is desirable that the slots 66 and 67 be so shaped as to insure constant acceleration of the Geneva wheel as the block 55 and roller 60 drive the same until just before the gear segment 56 takes over control. It is preferable that the wheel be rotating at a constant velocity when the gear segment 56 takes over the drive. During the time that the segment 56 is in engagement with the teeth 76 or 76' of gear 75, the Geneva wheel will be driven at a uniform velocity. To facilitate tooth disengagement, it is desirable that the slot 66 be so shaped that for a short time after the segment 56 has rotated out of engagement with the gear 75, the Geneva wheel continue to be driven at a uniform velocity. Then it is desirable that the Geneva wheel be gradually decelerated until it comes to a stop when the wheel is again locked against rotation.

The relative path of the center or axis $z$ of roller 60 and surface 64 of block 55 with respect to driven member 65 is a composite curve. It is a circular arc about axis $x$ of drive shaft 40 for that part of the path which is traced while the driven member is at rest. When the block 55 comes into engagement with a slot of the driven member, the radius $z$—$x$ is inclined to the center line $x$—$y$ of drive and driven members at an angle of 45° (Fig. 2) and then the path of center $z$ begins to bend away from the arc about center $x$. It is tangent to said arc at the position of Fig. 2. Tangency is required to obtain a gradual speed-up without bump. As the driven member 65 is accelerated, the path of center $z$ bends more away from the circle about center $x$. When gear segment 56 comes into engagement with gear 75 the driven member 65 will have uniform motion and this will continue until the gears roll out of engagement. Then deceleration will take place and the driven member will be brought to a gradual stop. The relative path of center or axis $z$ is preferably made symmetrical and preferably a constant acceleration of the driven member up to the speed of the uniform motion is provided with a constant deceleration of equal amount from the end of the uniform motion to stoppage.

The acceleration and deceleration are enforced through the engagement of circular portion 64 of block 55 with the one side of a slot 66 or 67, and by engagement of roller 60 with the opposite side of the slot. While all inertia loads are carried by the engagement of cylindrical surface 64 with one side of the slot, the engagement of the roller with the opposite side of the slot renders the motion positive in both directions. Cylindrical surface 64 and roller 60 have the same center $z$ and the sides of the slots 66 or 67 are equidistant from the relative path of center $z$ during motion of the driven member 65.

The design and computation of the relative path of point $z$ to obtain the desired motion will now be described. After the center distance $x-y$ (Fig. 8) of the driving and driven shafts has been selected, the number of teeth per 360° of the two gears 56 and 75 is found as: $n + N = 2 \, C \cdot P$, where C denotes the center distance $x-y$, P the diametral pitch, and $n$, $N$ are the tooth numbers per full turn of the teeth of gears 75 and 56.

$N = (n+N) - n \cdot a$ and B (Fig. 10) are half the uniform motion turning angles. They are related as follows:

$$a = \frac{n}{N} \cdot B$$

When constant acceleration is assumed, this means that the turning angle $\theta_1$ of the driven member is related to the turning angle $\theta$ of the driver as follows, see Fig. 14:

$$\theta_1 = c\theta^2$$

where $c$ is a constant to be determined.
Through differentiation:

$$\frac{d\theta_1}{d\theta} = 2c\theta$$

Thus:

$$\theta_1 = \frac{1}{2} \frac{d\theta_1}{d\theta} \cdot \theta$$

At the start of uniform motion, Fig. 10, the turning angles with $\theta_1 = 45°$ are:

$$\theta = (45° - a); \quad \theta_1 = (90° - B)$$

$$\frac{d\theta_1}{d\theta} = \frac{N}{n}; \quad c = \frac{N}{n \cdot 2\theta} = \frac{N}{n(90° - 2a)}$$

Further:

$$\theta_1 = (90° - B) = \frac{1}{2} \frac{d\theta_1}{d\theta} \cdot \theta = \frac{1}{2} \frac{N}{n}(45° - a)$$

With $$B = \frac{N}{n} \cdot a$$

this equation can be transformed into:

$$a = 180° \cdot \frac{n}{N} - 45° = 45° \left( 4 \cdot \frac{n}{N} - 1 \right)$$

and:

$$B = 45° \left( 4 - \frac{N}{n} \right)$$

$n/N$ is then changed until suitable angles $a$, B are obtained. For instance, if $n = 28$ and $N = 74$ then:

$$a = 23.11° \quad B = 61.07°$$

During a rotation of $(45° - a) = 21.89°$ of the driver, the driven member is brought up to full speed.

The path 120 of center $z$ can be computed as outlined in Fig. 14. Center $z$ is turned about axis $x$ of shaft 40 through any angle $\theta$ and turned back through the corresponding angle $\theta_1 = c\theta^2$ about the axis $y$ of shaft 70. Point $z'$ of path 120 is thereby obtained. After a master path has been very carefully made point by point, the trackways 66, 67 may be produced by any suitable copying process.

Preferably the relative path of center $z$ is so computed that the driven member will be rotating with the desired uniform motion just prior to engagement of gears 56 and 75 and will rotate for a slight period at this uniform motion after these gears roll out of mesh. The provision of uniform motion at the end of the accelerating motion when the segment 56 is about to enter into engagement with teeth 76 or 76' is a feature which contributes substantially to the successful operation of my mechanism. It lets the gears engage properly.

In the example described, the maximum speed of the driven member 65 as compared with the rotational speed of the driver 51 is $$\frac{74}{28} = 2.643$$

In the conventional Geneva index mechanism this ratio is $$\frac{1}{\sqrt{2}-1} = 2.414$$

Although the driven member turns 180° in the mechanism of the present invention, the top speed is, therefore, only slightly larger than in the conventional Geneva index where the driven member is turned only 90° in an indexing operation. The maximum accelerations are also found to be substantially equal in the present mechanism and in the conventional Geneva mechanism. In a conventional application of a Geneva index mechanism to a known type of bevel gear cutting machine, it is required to use a 2 to 1 speed up to drive after the Geneva wheel to obtain an indexing motion of half a turn. The indexing train after this 2 to 1 speed up is subjected to correspondingly increased accelerations. In the index mechanism of the present invention, on the other hand, not only is the need for speed-up gearing eliminated but inertia loads are reduced. It will be noted also that while the Geneva wheel 65 rotates through 180° during the indexing operation, the driver rotates through only 90°.

It should be noted, too, that in the index mechanism of the present invention the block 55 moves all the way through a slot 66 or 67 of the driven member. It enters the slot at one end and leaves it at the other end. In the conventional Geneva motion the slots have dead ends and the driver enters and leaves a slot at the same end.

It should be noted, also, that the roller 105 (Figs. 1 and 7) is disposed between the shaft 90 and the lock-dog 85. In conventional index lock-up mechanisms, the center of swing of the locking lever is between the cam roller and the locking-dog so that outward movement of the locking-dog corresponds to inward movement of the cam roller. With the mechanism disclosed, an outward movement of the locking-dog 85 calls for outward movement of the cam roller 105. A cam 50 of given size engaged by a roller or by a surface rather than a sharp edge, is capable of a far greater outward acceleration than inward acceleration. The mechanism of the present invention makes use of this property by using outward acceleration of the cam roller to disengage rapidly the locking pawl and to insure that the Geneva wheel is controlled at all times.

Although the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention relates and as may be applied to the essential features hereinbefore set forth and as fall within the scope of the invention or the limits of the appended claims.

Having thus described my invention, what I claim is:

1. In an index mechanism, a rotating driving member, a rotary driven member having a pair of generally parallel slots therein which extend approximately chordally across one face of the driven member, and a projection carried by the driving member in offset relation to its axis which is adapted to engage in and pass through said slots successively, said projection having a part of its periphery curved about the axis of the driving member and another part of its periphery curved about an axis parallel thereto, said parts being adapted to engage opposite sides of each slot of the driven member during passage of the projection through a slot, the radial distance of said projection from the axis of the driving member and the location of the slots relative to the axis of the driven member being so selected that as the driving member rotates on its axis, the driven member is driven through an angle of 180° during passage of the projection through a slot of the driven member and during rotation of the driving member through an angle of 90°.

2. In an index mechanism, a rotary driving member, a rotary driven member having a slot therein, a gear segment secured to said driven member to register with an intermediate portion of said slot, and a projection carried by the driving member which is offset from the axis thereof and which is adapted to engage in and pass through said slot as the driving member rotates on its axis, said projection having a gear segment secured thereto which is adapted to engage and mesh with the first-named gear segment during said passage, said projection driving the driven member by engagement with a wall of said slot during part of its passage through the slot and driving the driven member through the gear segments when said segments are in mesh.

3. In an index mechanism, a rotating driving member, a rotary driven member, a gear segment coaxial with said driven member and secured thereto, said driven member having an approximately chordal slot therein which is open at both ends beyond the teeth of said segment, a block carried by the driving member in offset relation to its axis which is adapted to pass through said slot and to engage one side thereof as the driving member rotates, a roller mounted on said block to engage the opposite side of said slot during said passage, and a gear segment carried by the block and adapted to mesh with the first-named gear segment during said passage, said block and second gear segment alternately driving the driven member during passage of the block through the slot.

4. In an index mechanism, a rotating driving member, a rotary driven member, a gear segment coaxial with said driven member and secured thereto, said driven member having an approximately chordal slot therein which is open at both ends beyond said gear segment, a projection carried by the driving member in offset relation to its axis which is adapted to pass through said slot during rotation of the driving member, and a gear segment secured to said projection to mesh with said first-named segment to drive said driven member alternately with the projection during passage of the projection through the slot, said slot being shaped to cause gradual speed-increase of the driven member during the first part of the passage of the projection through the slot and gradual speed-decrease of the driven member during the latter part of the passage, and said gear segments being adapted to drive the driven member at a uniform velocity while they are in engagement.

5. In an index mechanism, a rotating driving member, a rotary driven member, a gear segment coaxial with said driven member and secured thereto, said driven member having an approximately chordal slot therein which projects at both ends beyond the teeth of said segment, a block carried by the driving member in offset relation to its axis, which is adapted to pass through said slot as the driving member rotates, a roller mounted on said block to engage the outside of said slot during said passage, said block having its inside surface curved about the axis of the roller to engage the opposite side of the slot, a gear segment at the outside of said block which is coaxial with the driving member, said block and second gear segment being adapted to drive the driven member alternately during passage of the block through the slot.

6. In an index mechanism, a rotating driving member, a rotary driven member, said driven member having a generally chordal slot therein which is open at both ends, and a projection carried by said driving member in offset relation to its axis which is adapted to engage in and pass through said slot from one end thereof to the other during part of a revolution of the driving member to drive the driven member, said slot being so shaped that a gradually increased velocity will be imparted to the driven member during the first part of the travel of the projection through the slot and a gradually decreased velocity during the last part of that passage, and means separate from the projection and slot for driving the driven member at a uniform velocity during an intermediate portion of the travel of the projection through the slot.

7. In an index mechanism, a rotating driving member, a rotary driven member, said driven member having a generally chordal slot therein which is open at both ends, means for locking the driven member against rotation, means for periodically releasing said locking means, and a projection carried by said driving member in offset relation to its axis which is adapted to engage in and pass through said slot from one end thereof to the other, during the period when the driven member is released, to drive the driven member.

8. In an index mechanism, a rotating driving member, a rotary driven member, said driven member having a slot therein which is open at both ends, a gear segment secured to said driven member to be coaxial therewith and to register with an intermediate portion of said slot, and a projection carried by said driving member in offset relation to its axis and having a gear segment thereon which is coaxial with the axis of the driving member, said projection being adapted to pass through said slot from one end thereof to the other during part of a revolution of the driving member and to drive said driven member by engagement with the slot during part of its passage and by mesh of the gear segments during the rest of its passage, and said slot being so shaped that during passage of the projection through the slot the velocity of the driven member will be gradually increased up to the velocity imparted by said segments when in mesh and will be gradually decreased again until stopped.

9. In an index mechanism, a rotary driven member, means for locking the driven member against rotation, said driven member having a slot therein which is open at both ends, a gear segment secured to the driven member to be coaxial therewith and to register with an intermediate portion of said slot, a rotary driving member, means for periodically releasing said locking means comprising a cam coaxial with the driving member and operatively connected thereto, and a follower which engages said cam and is operatively connected to said locking member, and a projection carried by said driving member in offset relation to its axis and having a gear segment thereon which is coaxial with the axis of the driving member, said projection being adapted to pass through said slot from one end thereof to the other during release of the locking means and during part of a revolution of the driving member and being adapted to drive said driven member by engagement with the slot during part of its passage and by mesh of the gear segments during the rest of its passage, and said slot being so shaped that during passage of the projection through the slot the velocity of the driven member will be gradually increased up to the velocity imparted by the segments when in mesh and will be gradually decreased again until stopped, and means for moving the locking means back to locking position when the driven member is stopped.

ERNEST WILDHABER.

REFERENCES CITED

The following references are of record in the file of this patent:

UNITED STATES PATENTS

| Number | Name | Date |
| --- | --- | --- |
| 874,035 | Prentice | Dec. 17, 1907 |
| 1,045,102 | Armstrong | Nov. 19, 1912 |
| 1,112,184 | Allison et al. | Sept. 29, 1914 |
| 2,253,270 | Golber | Aug. 19, 1941 |
| 2,449,852 | Jones | Sept. 21, 1948 |

FOREIGN PATENTS

| Number | Country | Date |
| --- | --- | --- |
| 309,145 | Great Britain | Apr. 5, 1929 |
| 441,933 | Germany | Mar. 17, 1927 |
| 557,156 | Great Britain | Nov. 5, 1943 |